United States Patent
Kerns et al.

(10) Patent No.: US 6,819,679 B1
(45) Date of Patent: Nov. 16, 2004

(54) MULTIPROTOCOL PACKET FRAMING TECHNIQUE

(75) Inventors: Daniel J. Kerns, San Rafael, CA (US); Paul M. Elliot, Jenner, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/540,434

(22) Filed: Mar. 31, 2000

(51) Int. Cl.[7] .............................. H04J 3/06; H04J 3/24
(52) U.S. Cl. ...................... 370/474; 370/509; 714/776; 714/798
(58) Field of Search .................. 370/389, 392, 370/393, 394, 401, 428, 429, 465, 470, 472, 474, 503, 509, 510, 514; 714/746, 751, 753, 758, 775, 789, 798

(56) References Cited

U.S. PATENT DOCUMENTS

| | | | | |
|---|---|---|---|---|
| 5,742,765 A | * | 4/1998 | Wong et al. | 709/230 |
| 5,844,885 A | * | 12/1998 | Grob et al. | 370/216 |
| 5,936,967 A | * | 8/1999 | Baldwin et al. | 370/474 |
| 5,991,912 A | * | 11/1999 | Mao | 714/776 |
| 6,427,219 B1 | * | 7/2002 | Yang | 714/758 |
| 6,556,573 B1 | * | 4/2003 | Kaaresoja | 370/395.64 |
| 2002/0036993 A1 | * | 3/2002 | Park et al. | 370/329 |

OTHER PUBLICATIONS

Gopher://gopher–chem.ucdavis.edu, Jul. 20, 1998, (7 pages).
Synchronizing Telecommunications Networks: Synchronizing SDH/SONET, *Hewlett Packard*, 1995, (24 pages).
Synchronizing Telecommunications Networks: Basic Concepts, *Hewlett Packard*, 1995, (24 pages).
"ATM Virtual Path Ring Functionality in SONET—Generic Criteria", *Bellcore*, Issue 4, Feb. 1998, (75 pages).

* cited by examiner

*Primary Examiner*—Hassan Kizou
*Assistant Examiner*—Gregory B. Sefcheck
(74) *Attorney, Agent, or Firm*—Campbell Stephenson Ascolese LLP

(57) ABSTRACT

A method and system for packaging frames or packets encoded in a variety of formats, for example, Frame Relay, Ethernet, ATM, or TCP/IP. The method includes: accumulating first and second packets; determining the length of each packet; and storing the lengths into a header associated with the first packet. By using the length field, frame synchronization can be efficiently achieved and maintained for the packets encoded using the method.

44 Claims, 5 Drawing Sheets

MULTIPROTOCOL PACKET FRAMING TECHNIQUE

BACKGROUND

1. Field of the Invention

The present invention relates to communication protocols and more particularly to packaging of information transmitted over a SONET compatible network.

2. Description of the Related Art

In the field of communications, it is critical to provide a high bandwidth and reliable, low latency delivery of information such as video, data, and voice. Synchronous Optical Network (SONET) is a well known standard for high bandwidth transmission that uses optical carriers. SONET is defined in ANSI T1.105, ANSI T1.106, and ANSI T1.117, which are herein incorporated by reference. For a discussion of SONET, see also "Sonet & T1: Architectures for Digital Transport Networks" by Ulysses Black and Sharleen Waters, Prentice Hall, ISBN 0-13-447590-9, which is incorporated herein by reference in its entirety. In Europe, a standard similar to SONET, called Synchronous Digital Hierarchy (SDH) is used.

SONET defines a transmitted unit called "synchronous payload envelope". FIG. 1 depicts a synchronous payload envelope for Synchronous Transport Signal Level 1 (STS-1). In STS-1, a synchronous payload envelope is expressed as a 9 row by 90 column structure with 810 bytes total. Columns 1 to 3 correspond to a transport overhead, column 4 corresponds to a path overhead, and columns 4 to 90 correspond to an associated payload. The transport overhead and path overhead together provide operations, maintenance, provisioning, and administration information data channels within the SONET system. The transport overhead and path overhead are discussed in more detail below. The payload stores information such as video, data, or voice, each potentially packaged in various formats.

FIG. 2 depicts the layout of format bytes within the section, line, and path overheads in more detail. The format bytes in the section, line, and path overheads are well known in the field of SONET. Of particular interest are the bytes Z3, Z4, and Z5 of the path overhead. Those bytes have been denoted "growth" bytes under the SONET standard, thereby remaining unspecified and allowing for use as seen necessary.

SONET requires synchronization at three levels: bit, time slot, and frame. Bit synchronization refers to the transmission and receipt of bits with respect to a master clock frequency. Time slot synchronization refers to the alignment of transmitter and receiver so that time slots can be identified for retrieval of data. Time slot synchronization is accomplished by using a fixed frame format that separates overhead and payloads. Frame synchronization is the requirement that the beginning of each payload can be identified according to the master clock frequency. Frame synchronization further includes identifying the beginning of each frame/packet payload within the SONET payload according to the master clock frequency. For a general discussion of synchronization in SONET, see "Synchronizing Telecommunications Networks: Basic Concepts", Hewlett Packard Application Note 1264-1, April 1995 and "Synchronizing Telecommunications Networks: Synchronizing SDH/SONET", Hewlett Packard Application Note 1264-2, July 1995 which are incorporated herein by reference in their entirety.

Bit errors in transmitted packets or frames can lead to loss of synchronization, which can result in the discarding of packets or frames. One source of bit errors is improper frame/packet delineation, i.e., improper determination of a frame or packet boundary. Another source of bit errors is a noisy communications link.

Multi-protocol over ATM (MPOA) and PPP-over-SONET (POS) are two well known protocols for packet packaging and transport over SONET. For a description of MPOA, see "Multiprotocol Encapsulation over ATM Adaptation Layer 5" by Heinenen, R.F.C. 1483, July 1993, which is incorporated by reference herein in its entirety. For a description of POS, see "PPP over SONET/SDH", RFC 1619, W. Simpson, May 1994, which is incorporated by reference herein in its entirety and provided in Appendix A. One disadvantage of MPOA is its requirement that packetized information be segmented and reassembled to perform Layer 3 IP routing at each intermediate node. This requirement potentially slows the delivery of MPOA packetized information, leading thus to unsatisfactory delivery of video or other time critical information. One disadvantage of POS is that bit errors due that cause loss of synchronization increase with average packet size. As multimedia applications tend to have ever larger packet sizes, the reliability of POS potentially decreases for multimedia applications such as streaming video.

SUMMARY

A method and system are disclosed for packaging frames or packets encoded in a variety of formats, for example, Frame Relay, Ethernet, ATM, or TCP/IP. The method includes: accumulating first and second packets; determining the length of each packet; and storing the lengths into a header associated with the first packet. By using the length field, frame synchronization can be efficiently achieved and maintained for the packets encoded using the method.

Various embodiments of the present invention will be more fully understood in light of the following detailed description taken together with the accompanying drawings.

BRIEF DESCRIPTION OF THE DRAWINGS

Note that use of the same reference numbers in different figures indicates the same or like elements.

DETAILED DESCRIPTION

Figure 3:
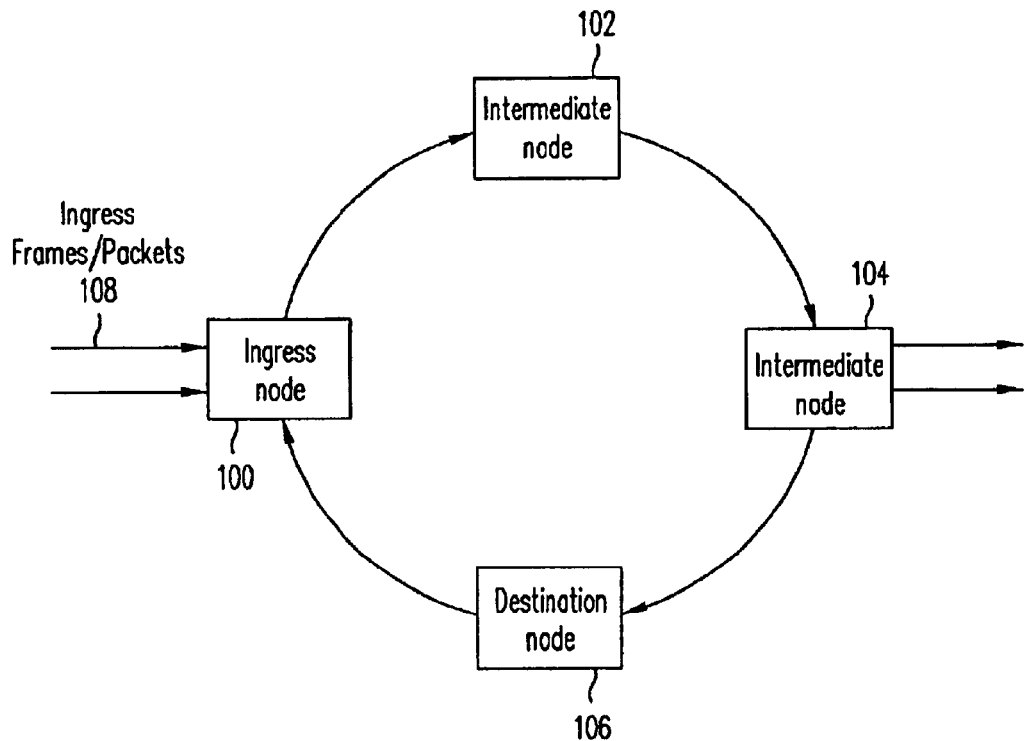
FIG. 3 schematically depicts a SONET network having nodes 100 to 106.

FIG. 3 schematically depicts a SONET network having nodes 100 to 106. For purpose of illustration, nodes 100, 102, and 104 correspond to respective ingress node 100, intermediate nodes 102, 104, and destination node 106. In one embodiment, for ingress frames/packets 108, ingress node 102 represents an entrance node to the SONET network while destination node 106 represents a destination node in the SONET network. The format of the ingress frames/packets 108 includes for example Frame Relay, TCP/IP, ATM, or Ethernet signals. For a packet or frame, the transit to each node after the ingress node is called a "hop". For a publication describing Frame Relay and TCP/IP, see "TCP/IP And Related Protocols, McGraw-Hill Series On Computer Communications", Third Edition, Ulysses D. Black, McGraw-Hill Companies, 1997, ISBN: 0079132820, and "TCP/IP Illustrated Volume 1: The Protocols", W. Richard Stevens, Addison-Wesley, 1994, both incorporated by reference in their entirety. For a publication describing Ethernet, see "Switched, Fast, And Gigabit Ethernet", Third Edition, Robert A. Breyer and Sean Riley, Macmillan, 1999, ISBN: 1578700736, which is incorporated by reference in its entirety. For a publication describing ATM, see "ATM networks", Othmar Kyas, Thomson Publishing, 1995, which is incorporated by reference in its entirety.

Figure 4:
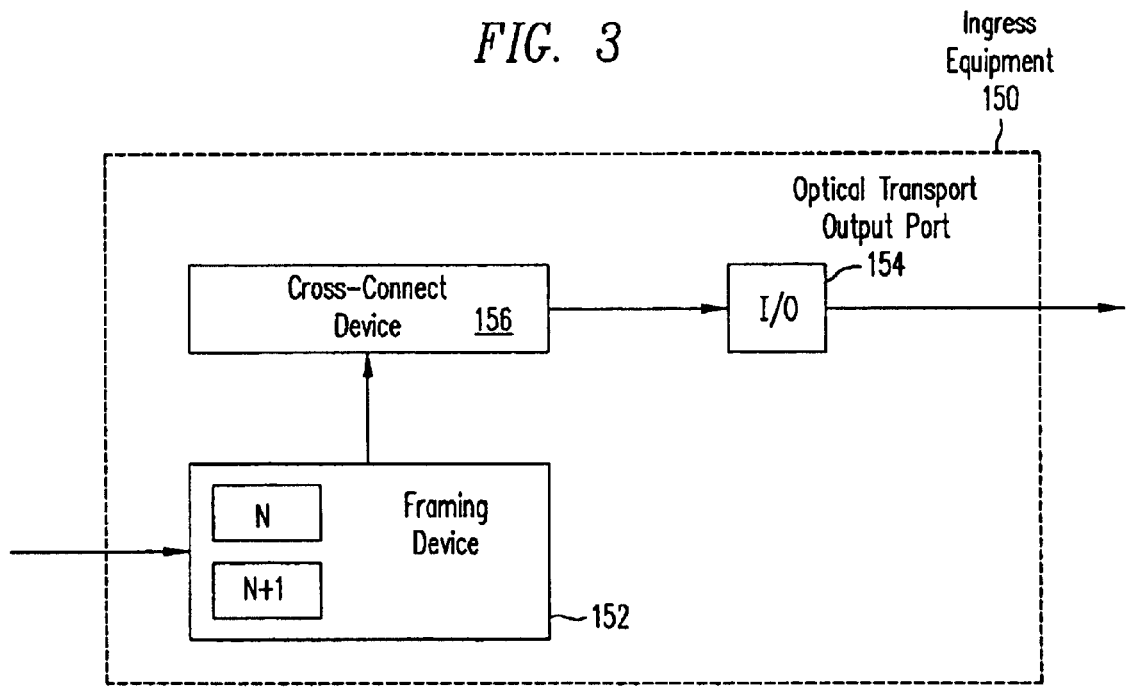
FIG. 4 schematically depicts a suitable ingress equipment 150, in accordance with one embodiment of the present invention.

FIG. 4 schematically depicts a suitable ingress equipment 150 that packages ingress information in a format in accordance with an embodiment of the present invention. Ingress equipment 150 includes framing device 152, such as a video coder/decoder, which packages frame N and frame N+1; optical transport output port 154, such as an OC-3, 12, 48, or 192 card; and cross connect device 156, such as an STS cross-connect.

Packaging

Figure 5:
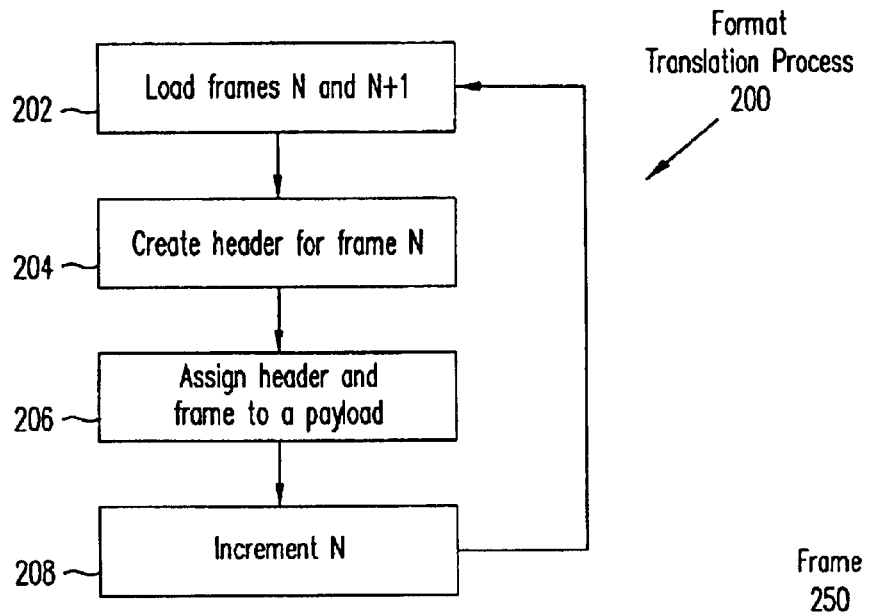
FIG. 5 depicts a format translation process 200 in accordance with one embodiment of the present invention.

FIG. 5 depicts a format translation process 200, performed by ingress equipment 150, where the process is in accordance with one embodiment of the present invention. A suitable implementation of process 200 is hardwired logic, although the process 200 can be performed by a processor which executes instructions stored on a computer-readable medium.

In act 202, ingress equipment 150 buffers two frames/packets 108, shown schematically in FIG. 4 as frame N and frame N+1. In one embodiment, to buffer frame N and frame N+1, ingress equipment 150 implements an input delay of up to two times a maximum size of a frame. If two frames are not received in such delay, then an empty frame or frames is/are inserted in order to maintain frame synchronization.

Figure 6:
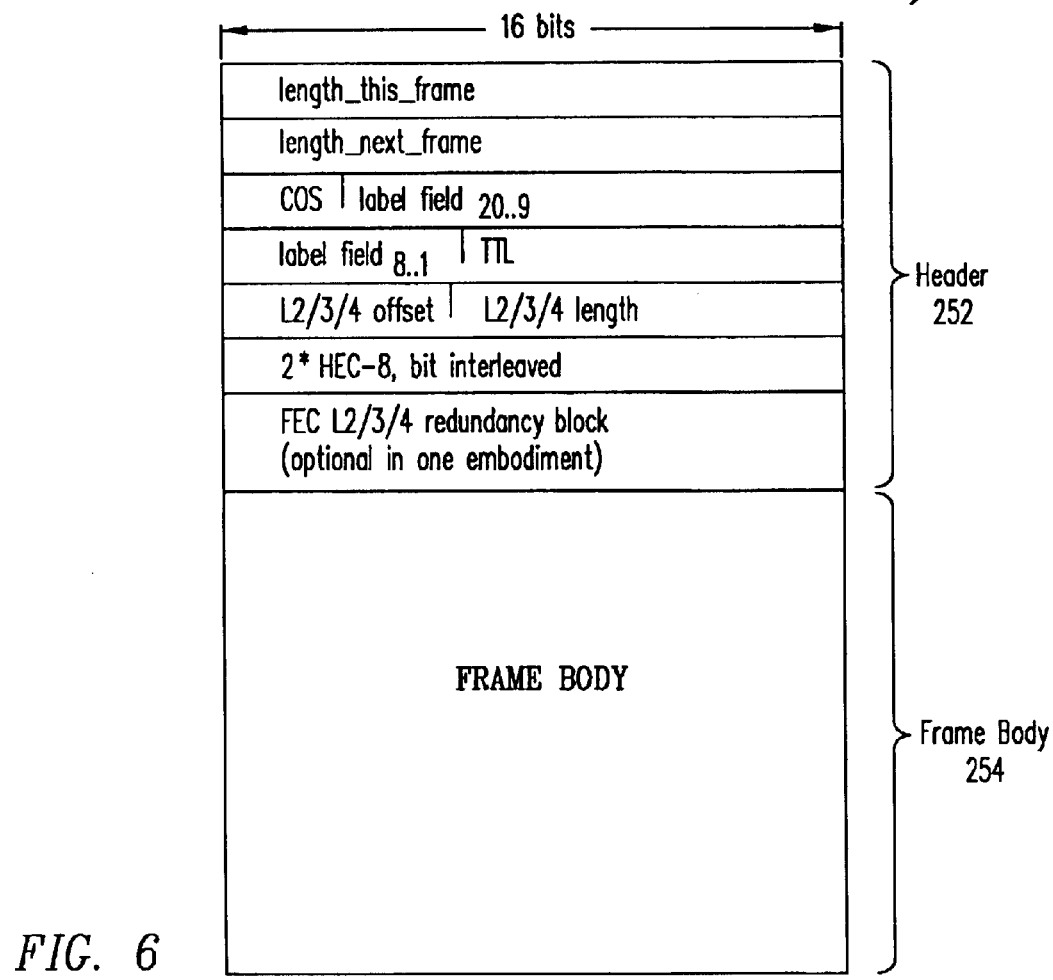
FIG. 6 depicts contents of a frame 250 having frame header 252 and frame body 254 in accordance with one embodiment of the present invention.

In act 204, the ingress equipment 150 creates a frame header for the frame N. FIG. 6 depicts contents of an exemplary frame 250 having frame header 252 and frame body 254 in accordance with this embodiment. In this example, frame header 252 corresponds to the frame header for the frame N and frame body 254 corresponds to frame N. As depicted, frame header 252 includes the following fields: length_this_frame, length_next_frame, class of service (COS), label field, time to live (TTL), L2/3/4 offset, L2/3/4 length, 2*HEC-8 interleaved, and FEC L2/3/4 redundancy.

Fields "length_this_frame" and "length_next_frame" respectively represent the lengths of two sequential frame bodies, which in this example are frame N and frame N+1. In this embodiment, the ingress equipment 150 counts the lengths of frames N and N+1 in bytes. In this embodiment, the fields "length_this_frame" and "length_next_frame" are each 16 bits.

Field "class of service" (COS) is similar to the COS field in the Internet protocol (IP) header. At ingress, the COS field can be set by a network administrator to specify a class of service for a frame. The COS field in an IP header is typically controlled by an end system host, such as a video coder/decoder. In this embodiment, the length of field COS is 3 bits.

The "label" field is similar to VPI/VCI fields in ATM. For example, the label field indicates: 1) a destination node and 2) flow identification. The label field is optionally derived from information from the headers of ingress frames/packets, described earlier. The label field can be changed by each intermediate node equipment. The label field can be used to support explicit routing, as distinct from hop-by-hop routing. Examples of explicit routing include multicast tunnels, route aggregation, OSPF virtual links, and BGP (border gateway protocol) peer links using tunnels. In this embodiment, the label field is 20 bits.

Field TTL (time-to-live) is commonly known in the art. In this embodiment, field TTL is similar to the TTL field used in the IP protocol. The TTL field specifies a maximum time that a frame body is considered valid.

The 2*HEC-8 (HEC stands for "header error correction) interleaved field is used to correct up to four bit errors in its associated frame header. In conventional ATM, a HEC-8 field is used to determine and correct errors in the ATM header. In this embodiment, the 2*HEC-8 interleaved field is two HEC-8 fields, bit interleaved. The 2*HEC-8 field allows for detection and correction of up to 2 bit errors.

L2/3/4 offset, L2/3/4 length, and FEC L2/3/4 are optional fields which are used together to provide FEC (forward error correction) coverage. L2/3/4 offset is an offset into the frame body 254. L2/3/4 length sets a length of bytes, from the byte specified by the L2/3/4 offset, on which an FEC redundancy is calculated. The FEC L2/3/4 field is used to correct errors in frame headers. For example, using a conventional Reed Solomon FEC encoder, on reception, a finite field algorithm is performed, to protect the layer 2 (e.g. Ethernet), layer 3 (e.g. IP), and layer 4 (e.g. UDP) headers from corruption by bit errors.

Figure 1:
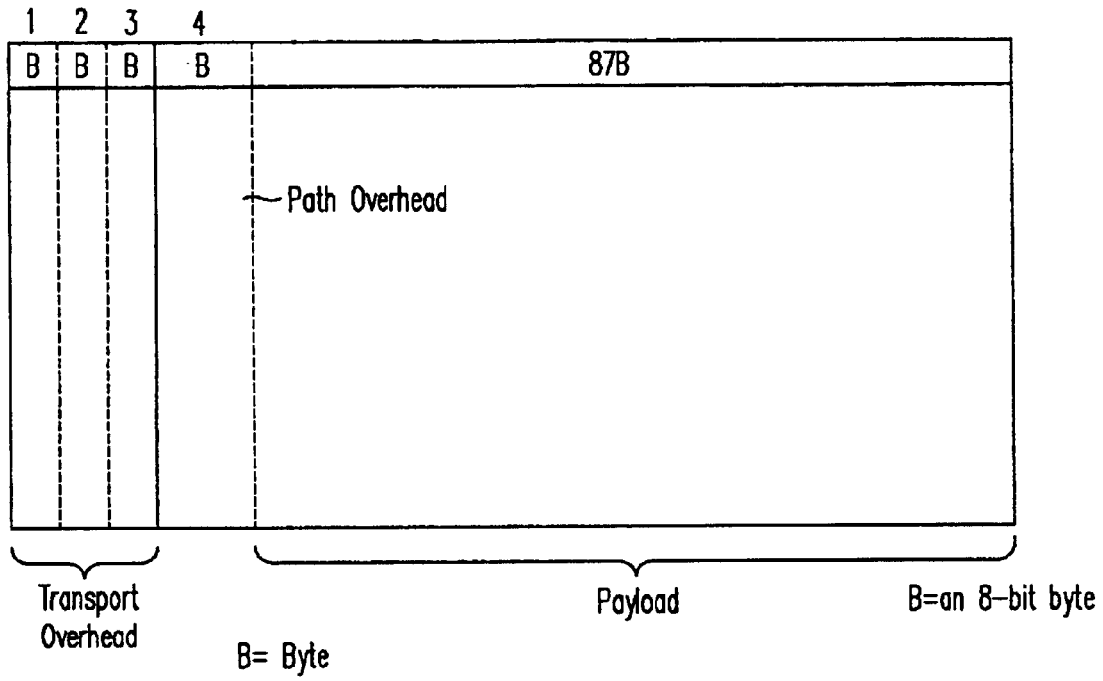
FIG. 1 depicts a synchronous payload envelope for STS-1.
Figure 2:
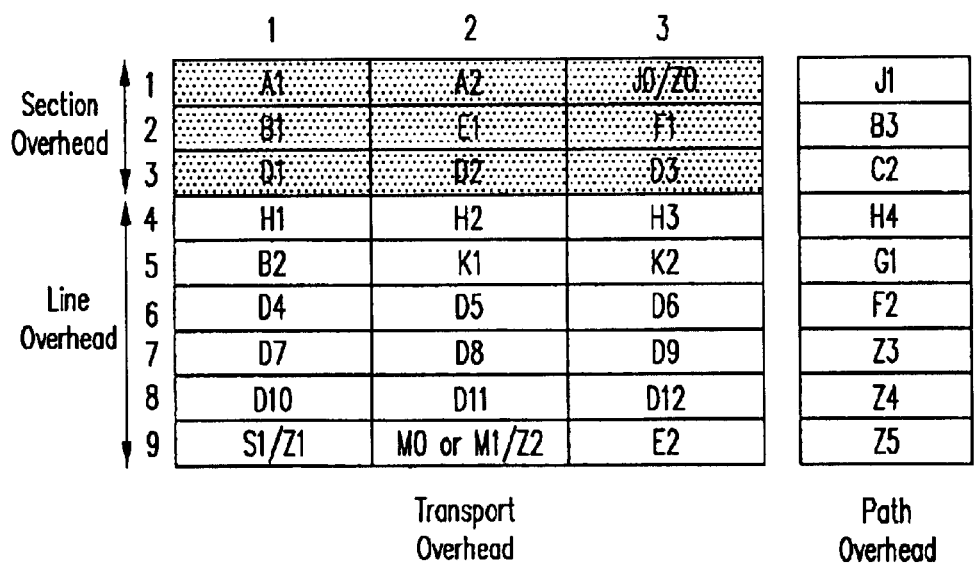
FIG. 2 depicts the layout of format bytes within the section, line, and path overheads in more detail.
Figure 7:
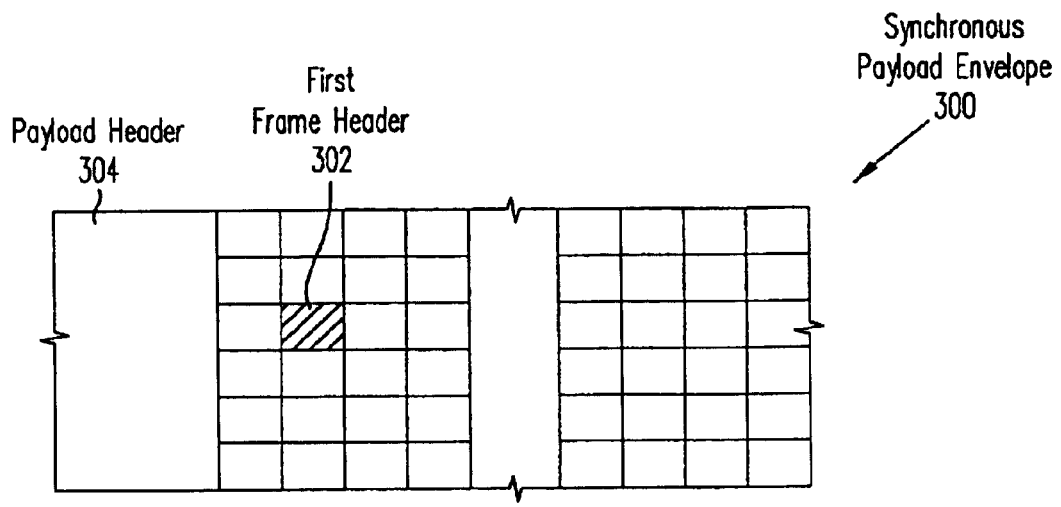
FIG. 7 depicts an exemplary synchronous payload envelope that includes the first frame header 302.

In act 206, the ingress equipment 150 stores frame N and its associated header $Z_H$ into a SONET payload. A "frame Z" is defined as a having 1) a frame body of frame N and 2) associated frame header, $Z_H$, where the frame header is created using process 200. Once the byte position of frame header, $Z_H$, within the synchronous payload envelope is established, the ingress equipment then writes an offset value into the associated SONET payload header. As illustrated in FIG. 7, in this embodiment, the offset value corresponds to a number of bytes between the Z4 location in the path overhead (FIG. 2) and first frame header 302, which is frame header $Z_H$ in this example. In this embodiment, the offset value is written into the Z3 and Z4 locations in the payload header 304 introduced with respect to FIG. 2.

In act 208, the ingress equipment 150 increments N and subsequently repeats acts 202 to 208 in order to package a next frame (e.g. frame N+1).

Achieving Frame Synchronization

Referring again to FIG. 3, the ingress equipment 150 periodically transmits synchronous payload envelopes to other nodes in the SONET network. The payload header and payload are received by an intermediate SONET node. Intermediate node equipment (INE) corresponding to the intermediate node 104 receives the payload header and payload. A suitable INE is similar to ingress equipment 150.

Figure 8:
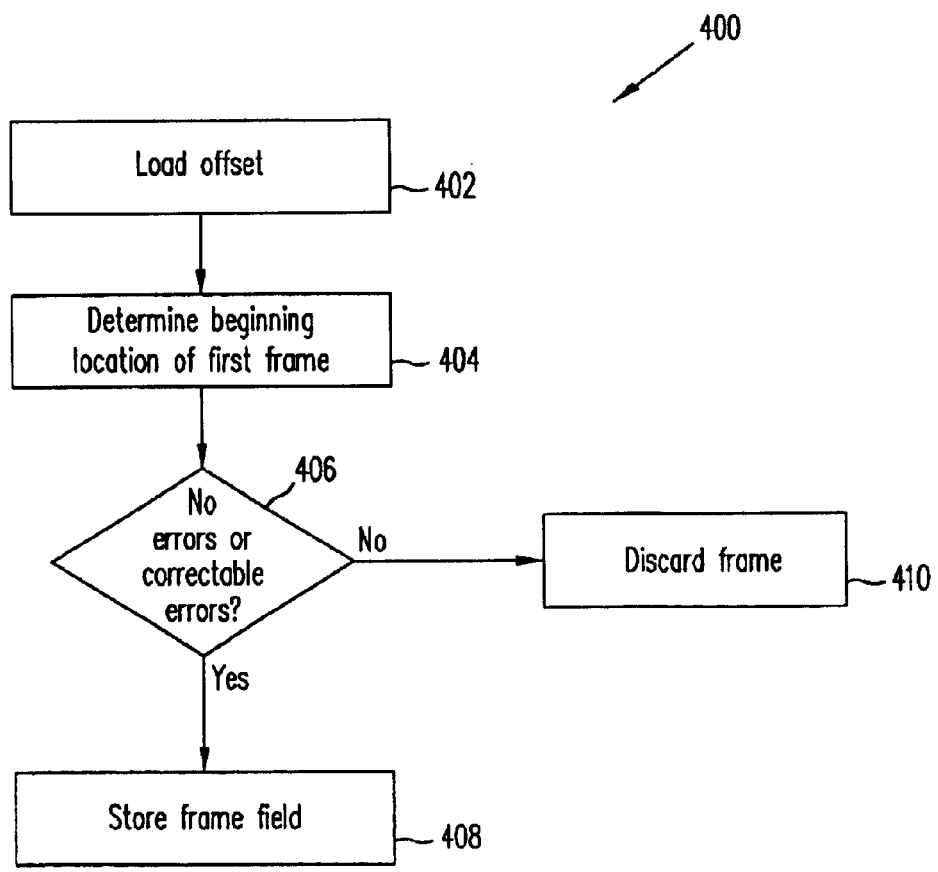
FIG. 8 depicts a process 400 in accordance with one embodiment of the present invention.

FIG. 8 depicts in process 400, a flow diagram of the operation of the intermediate node equipment (INE) in accordance with one embodiment. As stated earlier, "frame Z" represents a frame body of a frame N ($Z_N$) and associated header, $Z_H$, packaged in accordance with the process 200 described with respect to FIG. 5. A suitable implementation of process 400 is hardwired logic, although the process 400 can be implemented in software.

To achieve frame synchronization, the INE performs process 400, represented in FIG. 8. In act 402, INE loads the offset stored in Z3 and Z4 of the SONET path overhead, described above and introduced with respect to FIG. 2.

In act 404, the INE adds the offset to the beginning byte location of the synchronous payload envelope. The sum indicates a destination byte within the payload which should correspond to the first byte of the first frame header $Z_H$.

In act 406, the INE determines whether frame header $Z_H$ includes any errors and selectively corrects such errors. In this embodiment, in act 406, the INE uses the 2*HEC-8 field in a manner similar to that described in ATM to determine and correct bit errors in the frame header $Z_H$. First frame header $Z_H$ "passes" if either no bit error, one bit error is detected and corrected, or two bit errors are detected and corrected. If the first frame header $Z_H$ contains no bit error or correctable bit errors, frame synchronization is achieved and act 408 follows. If the frame header $Z_H$ contains more than two bit errors, the header check fails and act 410 follows.

In act 408, field "length_next_frame" from header $Z_H$ is stored for subsequent use. Subsequently the INE maintains frame synchronization by performing process 500, described below.

In act 410, frame synchronization is not achieved and the INE ignores the synchronous payload envelope containing frame Z as well as the associated frame header $Z_H$. Subsequently, the INE executes the process 400 on the next sequential synchronous payload envelope in order to achieve frame synchronization.

Thus one advantage of process 400 is that synchronization can be achieved despite multiple bit errors in a frame header. Thus loss of a synchronous payload envelope is avoided. For multimedia applications, such as video, it is desirable to avoid loss of a synchronous payload envelope. Such loss leads to a noticeable gap in a video presentation.

Maintaining Frame Synchronization

Figure 9:
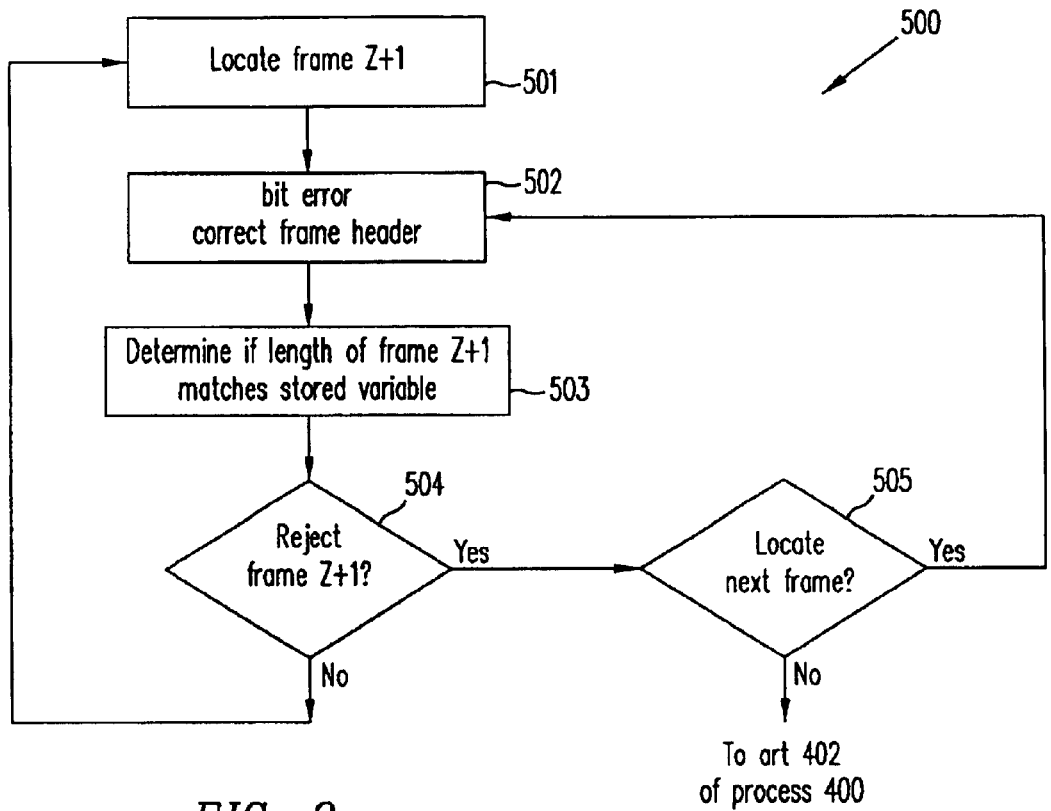
FIG. 9 depicts a flow diagram of a process 500 in accordance with an embodiment of the present invention.

FIG. 9 depicts a flow diagram of a process 500 performed by INE to maintain frame synchronization, in accordance with an embodiment of the present invention. In this embodiment, process 500 is performed following successful synchronization acquisition using process 400. A suitable implementation of process 500 is hardwired logic, although the process 500 can be performed by a processor which executes instructions stored on a computer-readable medium. In the following example, "frame Z+1" sequentially follows frame Z and represents a frame body of frame N+1 ($Z_{N+1}$) and associated header, $Z_{H+1}$, packaged in accordance with the process 200 described with respect to FIG. 5.

In act 501, intermediate node equipment locates a byte associated with the beginning of frame header $Z_{H+1}$ by, for example, counting from the perceived beginning byte of the frame header $Z_H$, by a sum of the number of bytes specified by "length_this_frame" (duplicated from header $Z_H$) plus the set length of a frame header (e.g., 14 bytes).

In act 502, INE performs a bit error detection on the frame header $Z_{H+1}$ associated with frame body $Z_{N+1}$ and selectively corrects errors in the frame header $Z_{H+1}$. In this embodiment, INE uses the 2*HEC-8 field in a manner similar as in ATM to detect and correct errors in the frame header $Z_{H+1}$. Table 1 depicts four results from act 502 and associated meanings.

TABLE 1

| | |
|---|---|
| HOK | no errors in header |
| H1 | 1 bit error detected in header and corrected |
| H2 | 2 bit errors detected in header and corrected |
| HUN | uncorrectable bit error detected in header |

Result HOK indicates that the frame header $Z_{H+1}$ does not include errors. For results H1 and H2, respective 1 and 2 bit errors are detected in the frame header $Z_{H+1}$ but corrected using the 2*HEC-8 process described earlier. Results H1 and H2 are associated with either a noisy communications link or attempted frame delineation in a wrong place.

For result HUN, the frame header $Z_{H+1}$ includes uncorrectable errors and the frame Z+1 is likely subsequently discarded.

In act 503, the intermediate node equipment determines if a number of bytes corresponding to field "length_next_frame" (from $Z_H$ and previously stored in act 408) matches the "length_this_frame" (from header $Z_{H+1}$). If so then variable LCP is logical TRUE.

Figure 10:
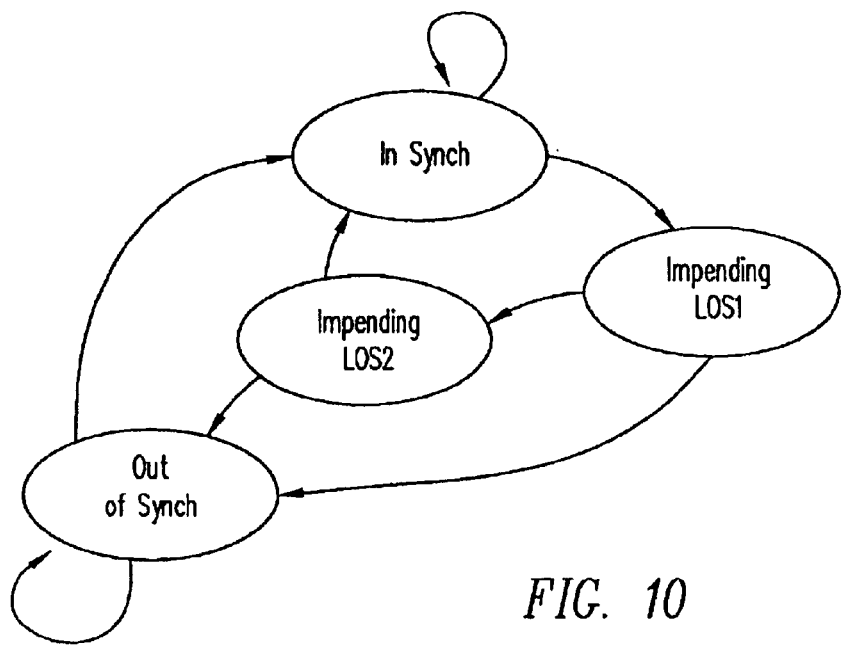
FIG. 10 depicts a state diagram in accordance with an embodiment of the present invention.

In act 504, for frame Z+1, using a result from act 502 and variable LCP, the INE determines whether to reject the frame Z+1 and whether synchronization is maintained. FIG. 10 depicts a state diagram that uses results from acts 502 and 503. The state diagram represents either frame synchronization is maintained (state In-Synch), close to lost (states Impending LOS1 and Impending LOS2), or lost (state Out of Synch). State In-Synch is the default state for frame Z+1.

State In-Synch represents that frame Z+1 is accepted and synchronization is maintained. From this state, if the result is H2 and LCP is true, frame Z+1 is accepted and the next state is Impending LOS1. If the result is HUN or LCP is false, frame Z+1 is rejected and the next state is Impending LOS1.

State Impending LOS1 represents that synchronization is close to lost. From this state, if the result is HOK and LCP is true, frame Z+1 is accepted and state Impending LOS2 is next. If the result is not HOK or LCP is false, frame Z+1 is rejected and state Out of Synch is next. This state may be the beginning state for a next sequential frame, frame Z+2.

State Impending LOS2 represents synchronization is close to lost. From this state, if LCP is true and the result is either HOK or H1, then frame Z+1 is accepted and state in Synch is next. Otherwise, frame Z+1 is rejected and state Out of Synch is next.

State Out of Synch (OS) represents frame synchronization is lost. From this state, to achieve frame synchronization, the process 200 described with respect to FIG. 5 is executed.

If the frame Z+1 is accepted, act 501 of process 500 is next. Otherwise, act 505 follows.

In act 505, the INE determines if a previous sequential frame (e.g., frame Z) was rejected. If so, act 402 of process 400 follows. Otherwise, the INE determines a location of the next sequential frame, frame Z+2, by using the "length_next_frame" from the frame header $Z_H$ (of frame Z) to count the length of rejected frame Z+1. Thus frame synchronization may be maintained where a frame Z+x, where $x \geq 1$, and its associated header is defective but a previous frame Z+x−1 was accepted by using the field "length_next_frame" of frame Z+x−1. Act 502 follows.

Thus one advantage of process 500 is that synchronization can be maintained despite loss of a frame. For multimedia applications, such as video, it is desirable to minimize frame loss. Such loss leads to noticeable gaps in a video presentation.

Comparison with MPOA and POS

Unlike ATM and MPOA, to maintain frame synchronization in intermediate nodes, processes 400 and 500 do not require segmentation and reassembly of frames. Thus processes 400 and 500 allow for quicker transit of frames through intermediate nodes. Similarly, unlike POS, to maintain frame synchronization in intermediate nodes, processes 400 and 500 do not require examination of an entire frame. Rather in processes 400 and 500, only the frame header is acquired and corrected prior to transfer/switching. Thus processes 400 and 500 allow for faster transit of frames through intermediate nodes than does POS.

Bit Error Rate Comparison with MPOA and POS

The following table 2 represents the probability of frame loss per second for a specified event while achieving synchronization, synchronized (In-Synch, Impending LOS1, or Impending LOS2), or unsynchronized (Out of Synch).

TABLE 2

| EVENT | IN-SYNCH | OUT-OF-SYNCH | ACHIEVING SYNCH |
|---|---|---|---|
| LCP + HOK | $O(1)$ | $O(2^{-32})$ | $O(1.5*10^{-5})$ |
| LCP + H1 | $O(M*BER)$ | $O(2^{-24}/5)$ | $<<O(MFPF)$ |
| LCP + H2 | $O(((M/2)*BER)^2)$ | $O(2^{-16}/5^2)$ | $<<O(MFPF)$ |
| LCP + HUN | $O(((M/2)*BER)^2)$ | $O(2^{-16})$ | $<<O(MFPF)$ |
| LCF + HOK | $<O(((M/2)*BER)^2)$ | $O(1.5^{-5})$ | $O(1)$ |
| LCF + H1 | $<O(((M/2)*BER)^2)$ | $O(2^{-8}/5)$ | $O(M*B)$ |
| LCF + H2 | $<O(((M/2)*BER)^2)$ | $O(5^{-2})$ | $<<O(MFPF)$ |
| LCF + HUN | $O(((M/2)*BER)^2)$ | $O(1)$ | $<O(MFPF)$ |

Term "MFPF" is the probability that a offset in the SONET overhead to a first frame Z has an error, and thus loss of an entire SONET payload, and is of order (16*BER).

Term "M" represents the length of a frame header in bits, excluding fields "L2/3/4 offset", "L2/3/4 length", and "FEC 12/3/4".

The term "BER" means bit errors occurring in an optical transmission media which are assumed to be caused by a homogenous Poisson process. See, e.g., GR-253 Core, SONET Transport Systems Common Criteria, Issue 2, December 1995, pages 5–21. The statistics are independent of the time spacing between events. Bit error rates of $10^{-6}$, $10^{-7}$, $10^{-8}$, and $10^{-9}$ are derived from bit error rates used to set the signal degrade (SD) criteria for protected facility equipment protection switch for equipment positioned at a SONET node, i.e., an add-drop multiplexer (ADM). See, e.g., GR-253 Core, pages 5–20, R5-40 for a discussion of SD criteria. Generally, an ADM can have up to the SD amount of bit errors before it is considered too noisy and the protection switch is taken to the cleaner facility.

Frame Loss Rate Comparison

The following table provides bit errors rates for a frame packaged in accordance with one embodiment of the present invention, where FEC redundancy has been calculated on the frame and over which FEC has been applied prior to any INEs using those header fields or prior to exit from the SONET network. Single bit error correction is performed and so, per node, the probability of a frame loss is on the order of $O((\text{header length in bits})*BER)^2$.

TABLE 3

| BER | Frame loss rate |
|---|---|
| $10^{-6}$ | $1.1*10^{-7}$ |
| $10^{-7}$ | $1.1*10^{-9}$ |
| $10^{-8}$ | $1.1*10^{-11}$ |
| $10^{-9}$ | $1.1*10^{-13}$ |

Frame loss rates are independent of the length of any of a frame. The optional L2/3/4/header thus gives better frame loss characteristics with respect to errors detected in the header and differentiates the header from the frame body.

Multi-protocol over ATM (MPOA) and PPP-over-SONET (POS) are two competing methods for frame transport over SONET. The following table 4 represents best case frame loss rates for MPOA (without ATM adaptation layer (AAL) type 5) trailer cyclic redundancy check (CRC) experienced at a receiver of a wide area network (WAN) as a consequence of IP header checksumming.

TABLE 4

| BER | | | |
|---|---|---|---|
| $10^{-6}$ | $10^{-7}$ | $10^{-8}$ | $10^{-9}$ |
| $3*10^{-4}$ | $3*10^{-4}$ | $3*10^{-4}$ | $3*10^{-4}$ |

The frame loss rates are independent of average frame size.

One implementation of POS uses byte stuffed HDLC. See "PPP in HDLC-like Framing", R. F. C. 1662, W. Simpson, July, 1994. Each receiver-link that supports POS or any other bit or byte-stuffed HDLC form (e.g., HSSI over DS3) must perform a CRC on the entire frame and frame body prior to determining mis-framing. The receiver-link must reject any frame that fails CRC checking. Mis-framing is a bit error in either the opening flag, closing flag or either byte of a two byte escape sequence.

The following table 5 represents the best case frame loss rates for POS.

TABLE 5

| BER/frame length | $10^{-6}$ | $10^{-7}$ | $10^{-8}$ | $10^{-9}$ |
|---|---|---|---|---|
| 200 | $1.6*10^{-3}$ | $1.6*10^{-4}$ | $1.6*10^{-5}$ | $1.6*10^{-6}$ |
| 400 | $3.2*10^{-3}$ | $3.2*10^{-4}$ | $3.2*10^{-5}$ | $3.2*10^{-6}$ |
| 1500 | $1.2*10^{-2}$ | $1.2*10^{-3}$ | $1.2*10^{-4}$ | $1.2*10^{-5}$ |

Note the error probability increases with frame size. Frame loss rates supported by POS do not approach the best case frame loss rates of MPOA.

Thus for the frames packaged in accordance with the process 200 and synchronized using processes 400 and 500, probabilities for frame loss per second remain constant as average frame size increases. As average frame sizes, the bit error rates for the frames packaged in accordance with the process 200 and synchronized using processes 400 and 500 approaches that of POS at a frame size of about 1 kilobyte. Further frame loss per second probability is much lower than MPOA and POS across a wide area network (WAN).

Example

For 5 hops across a WAN, T1 frame rate, average frame size of 400 bytes, session length of 30 minutes, each link sees a BER of 1e-7. The average frame rate is thus 500 frames/s. Thus a frame is lost for POS, MPOA (without AAL type 5 trailer CRC), and the format in accordance with the process 200 and synchronized using processes 400 and 500 are respectively every 1.3 seconds, 13 seconds, and $3.6 \times 10^5$ seconds.

Modifications

The above-described embodiments of the present invention are merely meant to be illustrative and not limiting. It will thus be obvious to those skilled in the art that various changes and modifications may be made without departing from this invention in its broader aspects. For example, the processes described herein can apply to STS-n, where $n \geq 2$. Therefore, the appended claims encompass all such changes and modifications as fall within the true scope of this invention.

The order in which the steps of the present method are performed is purely illustrative in nature. In fact, the steps can be performed in any order or in parallel, unless otherwise indicated by the present disclosure.

The method of the present invention may be performed in either hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among computers connected to the Internet. Accordingly, the present invention is not limited to any particular platform, unless specifically stated otherwise in the present disclosure.

We claim:

1. A method of providing frame headers for frame bodies, the acts comprising
   determining a length of an Nth frame body;
   determining a length of an (N+1)th frame body;
   generating an Nth frame header associated with the Nth frame body; and
   inserting the length of the Nth frame body and the length of the (N+1)th frame body ((N+1)th length field) into the Nth frame header.

2. The method of claim 1 further comprising the acts of:
   determining a length of an (N+2)th frame body;
   generating a (N+1)th frame header; and
   inserting the length of the (N+1)th frame body and the length of the (N+2)th frame body into the (N+1)th frame header.

3. The method of claim 2 further comprising the acts of:
   using the length of the (N+1)th frame from the Nth frame header to determine the beginning of an (N+2)th frame header associated with an (N+2)th frame body thereby to maintain frame synchronization.

4. The method of claim 1 further comprising the acts of:
   generating a header error correction field associated with the Nth frame header; and
   inserting the header error correction field into the Nth frame header.

5. The method of claim 4 further comprising the act of:
   using the header error correction field of the Nth frame header to correct multiple bit errors in the Nth frame header.

6. The method of claim 4 wherein the header error correction field comprises a 2*HEC-8 field.

7. The method of claim 1, further comprising the act of maintaining frame synchronization by:
   storing the (N+1)th length field;
   determining a beginning of an (N+1)th frame header associated with the (N+1)th frame body;
   determining uncorrectable bit errors in the (N+1)th frame header;
   determining a length of the (N+1)th frame body (determined length);
   comparing the determined length with the (N+1)th length field for equivalency; and
   if the determined length and the (N+1)th length field are equivalent, then frame synchronization is maintained.

8. The method of claim 7, wherein the act of determining a length of the (N+1)th frame body comprises using a field in the (N+1)th frame header that specifies the length of the (N+1)th frame body.

9. A method of maintaining frame synchronization, comprising the acts of:
   storing a length of an (N+1)th frame body, wherein a stored length of the (N+1)th frame body is specified in association with an Nth frame body;
   determining a length of an (N+1)th frame body;
   comparing the stored length with the determined length;
   determining the presence of errors associated with the (N+1)th frame body; and
   determining whether to pass the (N+1)th frame body based on the acts of comparing and determining the presence of errors.

10. The apparatus of claim 9, wherein the stored length of the (N+1)th frame body is specified in a frame header associated with the Nth frame body.

11. The method of claim 9, wherein the act of determining a length of an (N+1)th frame body further comprises inspecting a field in a frame header associated with the (N+1)th frame body.

12. The method of claim 9, wherein the (N+1)th frame body has an associated error correction field and wherein the act of determining whether to pass further comprises the act of using the error correction field.

13. The method of claim 12, wherein the error correction field comprises a 2*HEC-8 field.

14. The method of claim 9, further comprising the act of:
   passing the (N+1)th frame if both the errors are at least correctable and the length of the Nth frame body matches the stored length.

15. A method of maintaining frame synchronization comprising the acts of:
   determining a length of a first frame and a length of a second frame from a frame header associated with the first frame;
   identifying a defective second frame header associated with the second frame; and
   determining a beginning of a third frame header by using the length of said second frame.

16. The method of claim 15, wherein the length of the first frame and the length of the second frame are both fields stored in the frame header associated with the first frame.

17. An apparatus that provides frame headers for frame bodies, the apparatus comprising:
   logic circuitry that determines a length of an Nth frame body;
   logic circuitry that determines a length of an (N+1)th frame body;
   logic circuitry that generates an Nth frame header associated with the Nth frame body; and
   logic circuitry that inserts the length of the Nth frame body and the length of the (N+1)th frame body ((N+1)th length field) into the Nth frame header.

18. The apparatus of claim 17 further comprising:
   logic circuitry that determines a length of an (N+2)th frame body;
   logic circuitry that generates a (N+1)th frame header; and
   logic circuitry that inserts the length of the (N+1)th frame body and the length of the (N+2)th frame body into the (N+1)th frame header.

19. The apparatus of claim 18 further comprising:
logic circuitry that uses the length of the (N+1)th frame from the Nth frame header to determine the beginning of an (N+2)th frame header associated with an (N+2)th frame body thereby to maintain frame synchronization.

20. The apparatus of claim 17 further comprising:
logic circuitry that generates a header error correction field associated with the Nth frame header; and
logic circuitry that inserts the header error correction field into the Nth frame header.

21. The apparatus of claim 20 further comprising:
logic circuitry that uses the header error correction field of the Nth frame header to correct multiple bit errors in the Nth frame header.

22. The apparatus of claim 20 wherein the header error correction field comprises a 2*HEC-8 field.

23. The apparatus of claim 17, further comprising maintaining frame synchronization by:
logic circuitry that stores the (N+1)th length field;
logic circuitry that determines a beginning of an (N+1)th frame header associated with the (N+1)th frame body;
logic circuitry that determines uncorrectable bit errors in the (N+1)th frame header;
logic circuitry that determines a length of the (N+1)th frame body (determined length);
logic circuitry that compares the determined length with the (N+1)th length field for equivalency; and
if the determined length and the (N+1)th length field are equivalent, then frame synchronization is maintained.

24. The apparatus of claim 23, wherein the logic circuitry that determines a length of the (N+1)th frame body uses a field in the (N+1)th frame header that specifies the length of the (N+1)th frame body.

25. A apparatus of maintaining frame synchronization, comprising:
logic circuitry that stores a length of an (N+1)th frame body, wherein the stored length of the (N+1)th frame body is specified in association with an Nth frame body;
logic circuitry that determines a length of an (N+1)th frame body;
logic circuitry that compares the stored length with the determined length;
logic circuitry that determines the presence of errors associated with the (N+1)th frame body; and
logic circuitry that determines whether to pass the (N+1)th frame body based on an output of the logic circuitry that compares and an output of the logic circuitry that determines the presence of errors.

26. The apparatus of claim 25, wherein the stored length of the (N+1)th frame body is specified in a frame header associated with the Nth frame body.

27. The apparatus of claim 25, wherein the logic circuitry that determines a length of an (N+1)th frame body inspects a field in a frame header associated with the (N+1)th frame body.

28. The apparatus of claim 25, wherein the (N+1)th frame body has an associated error correction field and wherein the logic circuitry that determines whether to pass uses the error correction field.

29. The apparatus of claim 28, wherein the error correction field comprises a 2*HEC-8 field.

30. The apparatus of claim 25, further comprising:
logic circuitry that passes the (N+1)th frame if both the errors are at least correctable and the length of the Nth frame body matches the stored length.

31. A apparatus of maintaining frame synchronization comprising:
logic circuitry that determines a length of a first frame and a length of a second frame from a frame header associated with the first frame;
logic circuitry that identifies a defective second frame header associated with the second frame; and
logic circuitry that determines a beginning of a third frame header by using the length of said second frame.

32. The apparatus of claim 31, wherein the length of the first frame and the length of the second frame are both fields stored in the frame header associated with the first frame.

33. A computer system for providing frame headers for frame bodies, comprising computer instructions for:
determining a length of an Nth frame body;
determining a length of an (N+1)th frame body;
generating an Nth frame header associated with the Nth frame body; and
inserting the length of the Nth frame body and the length of the (N+1)th frame body ((N+1)th length field) into the Nth frame header.

34. A computer-readable storage medium, comprising computer instructions for:
determining a length of an Nth frame body;
determining a length of an (N+1)th frame body;
generating an Nth frame header associated with the Nth frame body; and
inserting the length of the Nth frame body and the length of the (N+1)th frame body ((N+1)th length field) into the Nth frame header.

35. A computer data signal embodied in a carrier wave, comprising computer instructions for:
determining a length of an Nth frame body;
determining a length of an (N+1)th frame body;
generating an Nth frame header associated with the Nth frame body; and
inserting the length of the Nth frame body and the length of the (N+1)th frame body ((N+1)th length field) into the Nth frame header.

36. A computer system for maintaining frame synchronization, comprising computer instructions for:
storing a length of an (N+1)th frame body, wherein the stored length of the (N+1)th frame body is specified in association with an Nth frame body;
determining a length of an (N+1)th frame body;
comparing the stored length with the determined length;
determining the presence of errors associated with the (N+1)th frame body; and
determining whether to pass the (N+1)th frame body based on the acts of comparing and determining the presence of errors.

37. A computer-readable storage medium, comprising computer instructions for:
storing a length of an (N+1)th frame body, wherein the stored length of the (N+1)th frame body is specified in association with an Nth frame body;
determining a length of an (N+1)th frame body;
comparing the stored length with the determined length;
determining the presence of errors associated with the (N+1)th frame body; and
determining whether to pass the (N+1)th frame body based on the acts of comparing and determining the presence of errors.

38. A computer data signal embodied in a carrier wave, comprising computer instructions for:

storing a length of an (N+1)th frame body, wherein the stored length of the (N+1)th frame body is specified in association with an Nth frame body;

determining a length of an (N+1)th frame body;

comparing the stored length with the determined length;

determining the presence of errors associated with the (N+1)th frame body; and determining whether to pass the (N+1)th frame body based on the acts of comparing and determining the presence of errors.

39. A computer system for maintaining frame synchronization, comprising computer instructions for:

determining a length of a first frame and a length of a second frame from a frame header associated with the first frame;

identifying a defective second frame header associated with the second frame; and determining a beginning of a third frame header by using the length of said second frame.

40. A computer-readable storage medium, comprising computer instructions for:

determining a length of a first frame and a length of a second frame from a frame header associated with the first frame;

identifying a defective second frame header associated with the second frame; and determining a beginning of a third frame header by using the length of said second frame.

41. A computer data signal embodied in a carrier wave, comprising computer instructions for:

determining a length of a first frame and a length of a second frame from a frame header associated with the first frame;

identifying a defective second frame header associated with the second frame; and determining a beginning of a third frame header by using the length of said second frame.

42. An apparatus that provides frame headers for frame bodies, the apparatus comprising:

means for determining a length of an Nth frame body;

means for determining a length of an (N+1)th frame body;

means for generating an Nth frame header associated with the Nth frame body; and means for inserting the length of the Nth frame body and the length of the (N+1)th frame body ((N+1)th length field) into the Nth frame header.

43. A apparatus of maintaining frame synchronization, comprising:

means for storing a length of an (N+1)th frame body, wherein the stored length of the (N+1)th frame body is specified in association with an Nth frame body;

means for determining a length of an (N+1)th frame body;

means for comparing the stored length with the determined length;

means for determining the presence of errors associated with the (N+1)th frame body; and means for determining whether to pass the (N+1)th frame body based on an output of the means for comparing and an output of the means for determining the presence of errors.

44. A apparatus of maintaining frame synchronization comprising:

means for determining a length of a first frame and a length of a second frame from a frame header associated with the first frame;

means for identifying a defective second frame header associated with the second frame; and means for determining a beginning of a third frame header by using the length of said second frame.

* * * * *